July 3, 1923.
W. C. WEISKE ET AL
1,460,739
VISOR FRAME FOR AUTOMOBILE WINDSHIELDS
Filed July 26, 1920
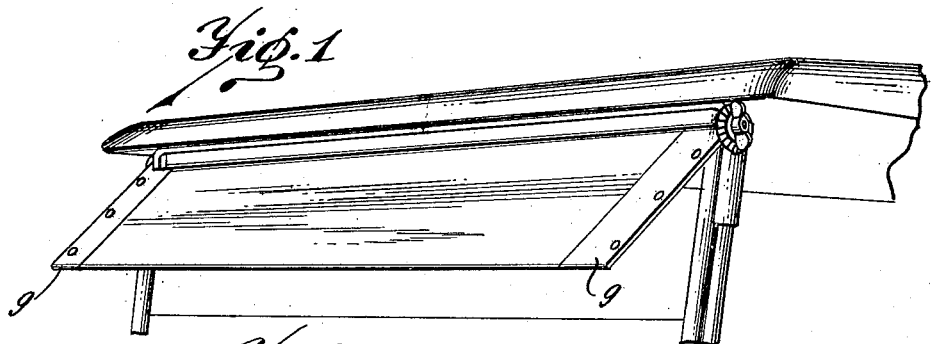
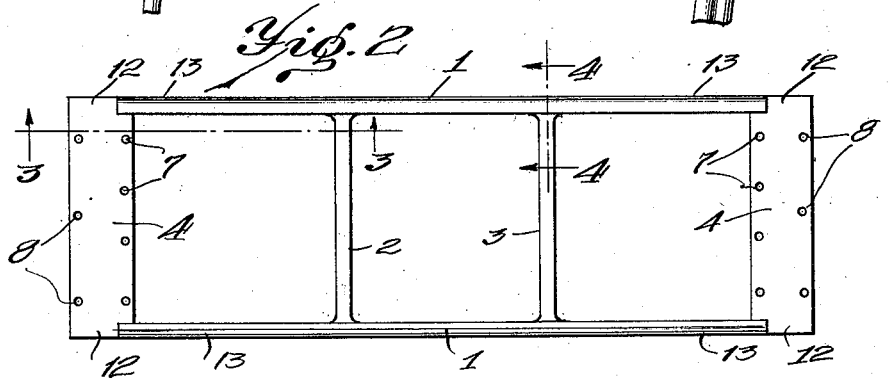
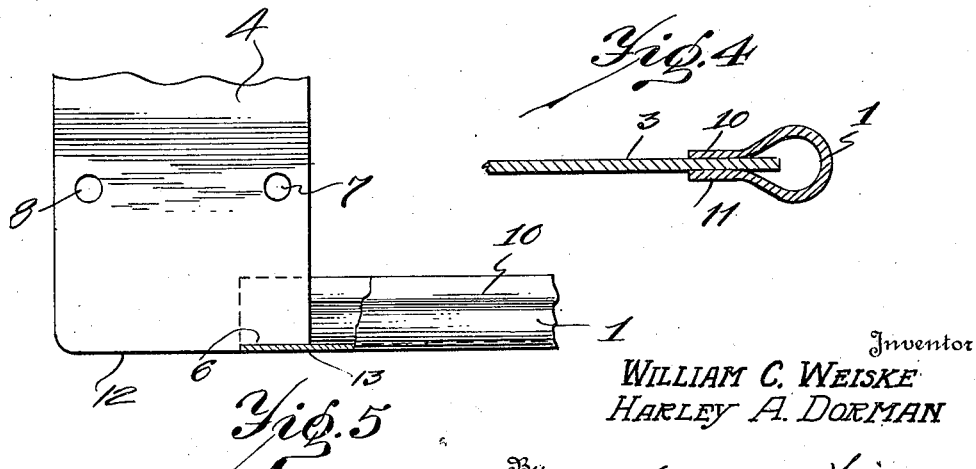
Inventor
WILLIAM C. WEISKE
HARLEY A. DORMAN
By 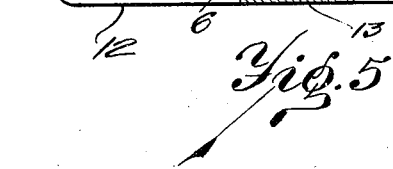
Attorney Patented July 3, 1923.

1,460,739

UNITED STATES PATENT OFFICE.

WILLIAM C. WEISKE AND HARLEY A. DORMAN, OF DETROIT, MICHIGAN.

VISOR FRAME FOR AUTOMOBILE WINDSHIELDS.

Application filed July 26, 1920. Serial No. 399,141.

*To all whom it may concern:*

Be it known that we, WILLIAM C. WEISKE and HARLEY A. DORMAN, citizens of the United States, residing at Detroit, county of Wayne, State of Michigan, have invented a certain new and useful Improvement in Visor Frames for Automobile Windshields, and declare the following to be a full, clear, and exact description of the same, such as will enable others skilled in the art to which it pertains to make and use the same, reference being had to the accompanying drawings, which form a part of this specification.

This invention relates to visor frames for automobile windshields and the object of the invention is to provide a visor frame which may be covered with opaque material and hingedly secured to or adjacent to a windshield. A further object of the invention is to provide a visor frame of the character described which is very rigid and of strong construction and on which the covering cannot sag or become loose. A still further object of the invention is to provide a visor frame which is strengthened by cross members and which when covered provides a device of very neat appearance and of very strong construction. These objects and the several novel features of the invention are hereinafter more fully described and claimed and the preferred form of construction by which these objects are attained is shown in the accompanying drawings in which—

Fig. 1 is a perspective view of a visor secured to an automobile windshield embodying our invention.

Fig. 2 is a plan view of the visor frame construction.

Fig. 3 is an enlarged section taken on line 3—3 of Fig. 2.

Fig. 4 is an enlarged section taken on line 4—4 of Fig. 2.

Fig. 5 is an enlarged detail of the manner in which the frame ends are secured to the longitudinal frame members.

The device consists of two longitudinal frame or side members 1 shown more particularly in Figs. 3 and 4. These frame members as indicated in Fig. 4 are substantially U shaped in cross section and may be formed from a blank of sheet metal bent upon itself to provide a tubular portion and ending in two extending spaced parallel portions 10 and 11 on one side as indicated in Fig. 4. Between these spaced parallel portions are positioned the ends of cross members 2 and 3 and the ends of the members 2 and 3 are spot welded therein thereby rigidly securing the members 2 and 3 and side members 1 together. As shown in Fig. 2 a sheet metal plate 4 is provided at each end of the members 1 and as shown in Fig. 5 these plates are notched at 6 to receive the ends of the said members, the said plates being positioned in the frame members 1 as shown in Fig. 4, and spot welded therein with the edges 12 of the plates 4 and the edges 13 of the members 1 extending flush. Each of these plates 4 is provided with a series of apertures 8 on the outer edge thereof. About the frame shown in Fig. 2 is secured an opaque covering which is waterproof, such as oil cloth, imitation leather or the like, preferably black in color providing a surface which will not reflect light. This material is folded over the lower edge of the visor frame and is sewed together at the upper edge thereof, the ends of the covering being riveted or otherwise secured to the end plates 4 through the apertures 7. When the covering has been thus secured to the frame a pair of visor supports 9 are secured over the ends of the members 4 and the edges of the opaque cover, the supports 9 being riveted through the apertures 8 to secure the same thereon, the completed vizor appearing as shown in Fig. 1. These supports conceal the rough edges of the opaque cover secured in the apertures 4 and are provided with adjusting devices on the upper ends thereof secured to the windshield frame by which the visor may be adjusted radially to properly shade the windshield. It is to be particularly noted that by the visor frame construction shown, the covering material is prevented from sagging in the center between the members 1 and between the supports 9 in which the visor frame is secured.

From the foregoing description it becomes evident that the device is very simple and efficient in operation, is of cheap construction and low manufacturing cost, prevents the covering material from sagging and provides a strong and rigid device which accomplishes the objects desired.

Having thus fully described our invention, its utility and mode of operation, what we claim and desire to secure by Letters Patent of the United States is—

1. In a visor frame for windshields, in combination with the windshield frame, a pair of side members in parallel relation, said members being formed of a sheet of metal folded upon itself to form a longitudinal tubular portion with the edges of the blank extending laterally therefrom in parallel spaced relation, the opening of one member facing that of the other, cross members extending from between the parallel portions of one side member into and between that of the other side member, an opaque covering for the frame, and a bracket fixedly attached to the covered frame concealing the cover ends, and means pivotally connecting the brackets to the windshield frame.

2. In a visor frame for windshields, an upper and a lower side member substantially U shaped in cross section, the open edges being in opposed relation, a series of cross members having the ends secured to the respective U shaped side members, a pair of end plates each having a notch at the opposite ends and engaging in the U members with the outer side of each U member flush with the remaining portion of the ends of the said end members, both the inner and outer edges of the said end plates having a series of apertures, a fabric covering for the frame secured to the end plates at the inner apertures, and visor supports secured to the plates at the said outer apertures and covering the visor fabric at the ends.

3. In a visor frame for windshields, a pair of side members in parallel relation, substantially U shaped in cross section with the open ends thereof facing each other, a series of cross members having the ends positioned between the parallel sides of the two U shaped members and welded in position therein, and an end plate spot welded between the parallel sides of the U shaped members at each end and extending outwardly therefrom, the said end plates being each provided with a series of apertures by which the cover may be secured on the visor frame, the end plates being also provided with a second series of apertures by which the visor frame may be secured in the supports therefor.

In testimony whereof we sign this specification.

WILLIAM C. WEISKE.
HARLEY A. DORMAN.